US011771971B2

(12) United States Patent
Piana et al.

(10) Patent No.: US 11,771,971 B2
(45) Date of Patent: Oct. 3, 2023

(54) SYSTEMS AND METHODS FOR MOBILE MOLDING AND BONDING

(71) Applicant: Piana Nonwovens, LLC., Cartersville, GA (US)

(72) Inventors: Andrea Piana, Atlanta, GA (US); Michael Stephen DeFranks, Atlanta, GA (US); Eric McCann, Kennesaw, GA (US); Andy Hollis, White, GA (US); Sang-hoon Lim, Kennesaw, GA (US); Helias Andriessen, Smyrna, GA (US); Mehran Jafari, Kennesaw, GA (US)

(73) Assignee: PIANA NONWOVENS, Cartersville, GA (US)

( * ) Notice: Subject to any disclaimer, the term of this patent is extended or adjusted under 35 U.S.C. 154(b) by 648 days.

(21) Appl. No.: 16/842,829

(22) Filed: Apr. 8, 2020

(65) Prior Publication Data
US 2020/0338876 A1 Oct. 29, 2020

Related U.S. Application Data

(60) Provisional application No. 62/837,417, filed on Apr. 23, 2019.

(51) Int. Cl.
*A63B 69/00* (2006.01)
*B29C 70/00* (2006.01)
(Continued)

(52) U.S. Cl.
CPC ........ *A63B 69/0048* (2013.01); *B29C 70/342* (2013.01); *B32B 5/022* (2013.01);
(Continued)

(58) Field of Classification Search
CPC ... A63B 69/00; A63B 69/004; A63B 69/0048; B29C 70/00; B29C 70/30; B29C 70/34;
(Continued)

(56) References Cited

U.S. PATENT DOCUMENTS 4,072,453 A * 2/1978 Oltmanns ........... B29C 49/0021
425/371
9,005,495 B2 4/2015 Wang et al.
(Continued)

FOREIGN PATENT DOCUMENTS

WO 1991/017336 A1 11/1991

*Primary Examiner* — Jacob T Minskey
*Assistant Examiner* — Matthew Hoover
(74) *Attorney, Agent, or Firm* — WCF IP

(57) ABSTRACT

A mobile molding system, comprising a vehicle and one or more molds arranged on the vehicle configured for receiving one or more expandable nonwoven substrates, heating said one or more expandable nonwoven substrates so as to cause said one or more expandable nonwoven substrates to expand and fill the one or more molds with one or more expanded nonwoven containing articles of three dimensional shape, and releasing said one or more expanded nonwoven containing articles of three dimensional shape from the one or more molds is provided. Methods for manufacturing three dimensional objects using the mobile molding system are also provided.

5 Claims, 10 Drawing Sheets

(51) Int. Cl.
  *B32B 5/00* (2006.01)
  *B32B 37/00* (2006.01)
  *B32B 39/00* (2006.01)
  *B29C 70/34* (2006.01)
  *B32B 5/02* (2006.01)
  *B32B 5/26* (2006.01)
  *B29L 31/00* (2006.01)

(52) U.S. Cl.
  CPC ............ *B32B 5/26* (2013.01); *B32B 37/0046* (2013.01); *B32B 39/00* (2013.01); *B29L 2031/771* (2013.01); *B32B 2262/0276* (2013.01); *B32B 2262/0284* (2013.01); *B32B 2367/00* (2013.01); *B32B 2605/003* (2013.01)

(58) Field of Classification Search
  CPC ........... B29C 70/342; B32B 5/00; B32B 5/02; B32B 5/022; B32B 5/20; B32B 5/26; B32B 37/00; B32B 37/004; B32B 37/0046; B32B 39/00
  See application file for complete search history.

(56) References Cited

U.S. PATENT DOCUMENTS

| | | |
|---|---|---|
| 2012/0006381 A1 | 1/2012 | Sorgento |
| 2014/0374933 A1* | 12/2014 | Flitsch ................ E01C 23/0966 425/62 |
| 2017/0182696 A1* | 6/2017 | Cantlin .................... B29B 9/06 |

* cited by examiner

SYSTEMS AND METHODS FOR MOBILE MOLDING AND BONDING

CROSS-REFERENCE TO RELATED APPLICATIONS

This application claims priority to U.S. Provisional Application 62/837,417 filed Apr. 23, 2019, the complete contents of which is incorporated herein by reference.

FIELD OF THE INVENTION

The invention is generally related to a mobile means for providing composite nonwoven structures to consumers on site. In particular, compressed nonwoven materials may be expanded within a mold arranged on a vehicle to produce a variety of composite structures include cushioning articles such as furniture (e.g. indoor, outdoor, recreational, etc.), bedding (e.g. mattresses, pillows, toppers, etc.), seating (e.g. automotive, aviation, maritime, etc.) and exercise (e.g. yoga mat, etc.) applications.

BACKGROUND OF THE INVENTION

Textile nonwoven materials (referred to as "nonwovens") have advantages over typical polyurethane (PU) foams for use in cushioning materials in terms of weight, costs, and performance. By performance, for example, having a nonwoven near the person, i.e., adjacent his or her back or buttocks in a car seat, adjacent the person's body in a mattress, etc., provides a more comfortable feel to the person, e.g., it tends to be "cooler" since air can pass through the nonwoven, so that the person does not sweat as much. In addition, the nonwoven can provide advantages in terms of "hardness" and better support factors, making the nonwoven material relatively more comfortable to sit or lay on than a PU foam.

Further, the production of polyurethanes in general has health, safety and environmental impacts that cannot be neglected. The National Toxicology Program from the Department of Health and Human Services lists toluene diisocyanates (TDI, CAS No. 26471-62-5) as "reasonably anticipated to be a human carcinogen". Toluene diisocyanates "are used primarily to manufacture flexible polyurethane foams for use in furniture, bedding, and automotive and airline seats". The production of polyurethane also has various hazardous air pollutants emission points that need to be dealt with. Hence, the processing of polyurethane has a few environmental and safety compliance requirements that can be a turn off in this environmentally conscious era. In addition, polyurethane foams are not readily recycled and in most cases are destined to reside in a landfill at the end of their useful life. In contrast, nonwoven materials are completely recyclable and address the current expectations of today's environmentally conscious consumer.

However, transport of large, expanded nonwoven materials (e.g. a mattress) that were produced in a factory can be costly and detrimental to the environment. There is also a need to provide more customization opportunities to consumers in regards to the final composite nonwoven product.

SUMMARY

Aspects of the disclosure provide a new system and methodology for making molded components including but not limited to bedding, furniture, automotive seats, airplane seats, boat seats, etc. on site at a consumer's location. Thus, embodiments of the disclosure bring the factory to a consumer's home and allow the consumer to be involved with making key design decisions associated with personalizing the molded cushioning article. Moreover, significant cost reduction is afforded to the manufacturer/retailer via shortening of the value creation period, late customization advantages, and supply chain optimization.

One aspect of the disclosure provides a mobile molding system, comprising a vehicle and one or more molds arranged on the vehicle configured for receiving one or more expandable nonwoven substrates, heating said one or more expandable nonwoven substrates so as to cause said one or more expandable nonwoven substrates to expand and fill the one or more molds with one or more expanded nonwoven containing articles of three dimensional shape, and releasing said one or more expanded nonwoven containing articles of three dimensional shape from the one or more molds. In some embodiments, the system further comprises one or more of the following provided on the vehicle: one or more expandable nonwoven substrates, a cutting device, a steam generation system, a vacuum pump, a refrigeration system, and a heater configured to heat the mold. In some embodiments, the nonwoven substrates are vertically lapped, carded nonwoven boards. In some embodiments, the one or more molds are permanently affixed to the vehicle. In some embodiments, the vehicle is a truck, flatbed, or trailer.

Another aspect of the disclosure provides a method for manufacturing three dimensional objects, comprising providing the mobile molding system as described herein, placing one or more expandable nonwoven substrates in the mold, heating the one or more expandable nonwoven substrates in the mold, wherein the one or more expandable nonwoven substrates expand in at least one dimension to at least partially fill the mold and to form at least one object which includes one or more expanded nonwoven substrates, cooling the at least one object to provide the at least one object with a shape that at least partially assumes a configuration defined by the mold, and opening the mold and retrieving the at least one object.

In some embodiments, the heating step includes the steps of pressurizing the mold with a gas; and then directing steam into the mold during or after releasing some of the gas from the mold. In some embodiments, the gas is air. In some embodiments, the placing step includes placing more than one expandable nonwoven substrates in the mold. In some embodiments, the placing step includes the step of placing one or more materials different from the one or more expandable nonwoven substrates in the mold. In some embodiments, the one or more materials are selected from the group consisting of foam, fabric, rubber, metal, metal alloy, polymer, ceramic, and paper materials.

In further embodiments, a method as described herein comprises a step of laminating one or more expandable nonwoven substrates together to form one or more laminated boards, wherein said placing step is accomplished by placing said one or more laminated boards in said mold.

In further embodiments, a method as described herein comprises a step of laminating one or more expandable nonwoven substrates and one or more non-expanding substrates together to form one or more laminated boards, wherein said placing step is accomplished by placing said one or more laminated boards in said mold. In some embodiments, the one or more non-expanding substrates are selected from the group consisting of foam, fabric, rubber, metal, metal alloy, polymer, ceramic, and paper materials.

In further embodiments, a method as described herein comprises steps of forming one or more laminated boards by either laminating one or more expandable nonwoven substrates together, or laminating at least one expandable nonwoven substrate together with at least one non-expandable substrate; and cutting said one or more laminated boards to one or more parts of specified sizes, and wherein said placing step is accomplished by placing said one or more parts in said mold.

In further embodiments, a method as described herein comprises a step of positioning a device or material within the mold, wherein the at least one object adheres to or is otherwise attached to the device or material after the at least one object is retrieved from the mold. In some embodiments, the device or material is a frame. In some embodiments, the frame is made of wood, polymer, ceramic, or metal.

In further embodiments, a method as described herein comprises steps of drawing a vacuum pressure inside said mold after said heating step and before said opening step; and releasing the vacuum pressure before, during, or after said cooling step. In some embodiments, the drawing and releasing steps are repeated a plurality of times before the opening step.

BRIEF DESCRIPTION OF THE DRAWINGS

FIG. 6a shows a board without non-expanding layers, and FIG. 6b shows a board with one or more non-expanding layers;

DETAILED DESCRIPTION

Figure 1A:
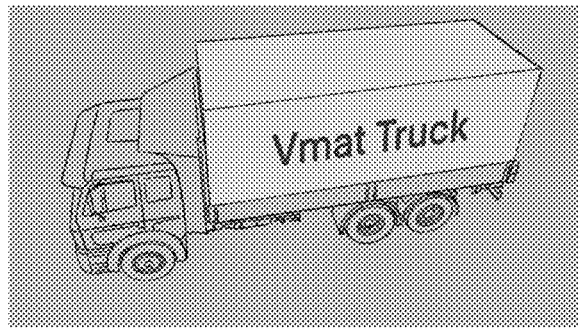
FIG. 1a-1f is an exemplary illustration of a mobile molding system according to some embodiments of the disclosure.
Figure 1B:
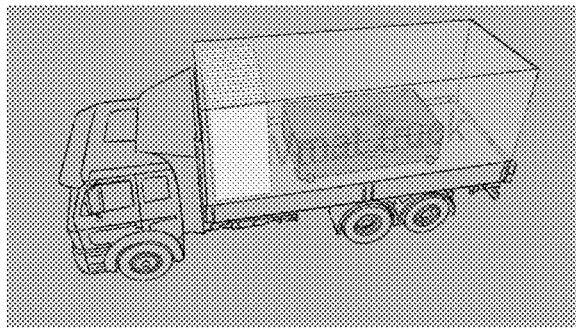
Figure 1C:
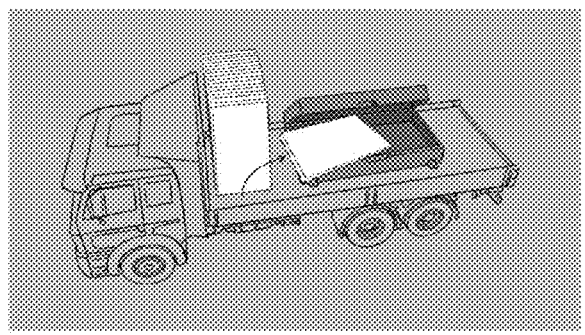
Figure 1D:
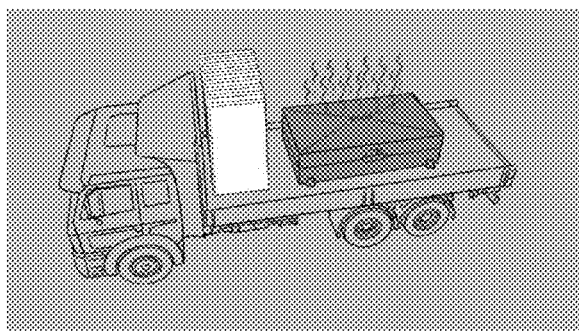
Figure 1E:
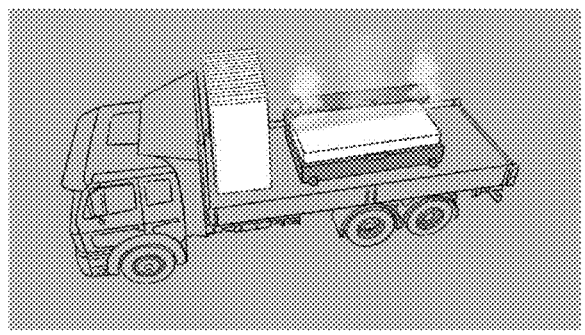
Figure 1F:
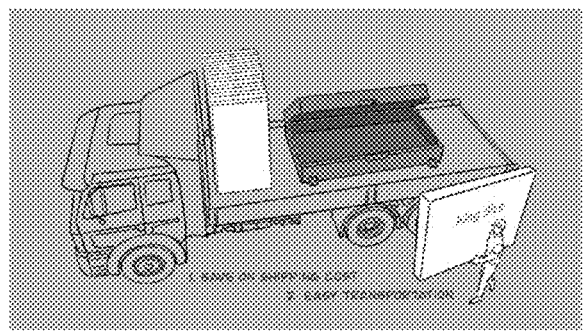

With reference to FIGS. 1a-1f, embodiments of the disclosure provide a mobile molding system, comprising a vehicle and one or more molds arranged on the vehicle configured for heating a nonwoven substrate. An exemplary method comprises the steps of producing thermally bonded, vertically lapped, carded nonwoven materials (i.e. VLAP blanks), laminating and/or compressing VLAP blanks together by applying heat to the VLAP blanks and cooling them to the proper thickness to produce a VLAP board. VLAP boards are subsequently cut into 2D shapes, placed inside a 3D mold, and with the addition of heat, create a 3D composite structure. One or more of the foregoing process steps may be performed on the vehicle of the mobile molding system.

Typical composite structures include cushioning articles such as furniture (e.g. indoor, outdoor, recreational, etc.), bedding (e.g. mattresses, pillows, toppers, etc.), seating (e.g. automotive, aviation, maritime, etc.) and exercise (e.g. yoga mat, etc.) applications.

While lamination and/or compression and/or molding may occur in a factory, embodiments of this disclosure provide the same in a mobile means whereby the factory is brought directly to the customer. Numerous consumer advantages are possible, including custom assembly, personalization of the final product, and zero delivery time. Advantages to manufacturing include raw material SKU reduction, elimination of finished goods inventory, and waste elimination via streamlined value creation. Retailers enjoy the high profit margins associated with custom, personalized products that were manufactured and delivered at commodity prices. As with food trucks and mobile dental centers, a mobile molding and bonding vehicle may have all the elements of a small factory store.

Exemplary vehicles include, but are not limited to, trucks, flatbeds, trailers, or other automobiles or transport devices whether having an internal combustion engine, an electric motor, or a hybrid system.

One or a plurality of molds of various geometries may be permanently or removably affixed to the vehicle. Exemplary molds include compression molds such as those manufactured by the Gemini Group. The mold may have dimensions configured to produce, e.g. example a mattress (twin, full, queen, king, and other sizes), pillows, toppers, seating, (e.g. automotive, aviation, maritime, etc.), or any other cushioned article. By "permanently affixed", it is meant that the mold is essentially integrated into the vehicle such that it could not be removed without damage to the vehicle. A mold that is "removably affixed" may include some means to attach it to the vehicle, e.g. bolts, but could be removed without significant damage. In some embodiments, the mold may be provided with wheels or a conveyer belt to assist in movement around the vehicle.

As described in more detail below, the vehicle may also be equipped with one or more of the following to allow for performing a process as described herein: one or more expandable nonwoven substrates, a cutting device, a steam generation system, a vacuum pump, a refrigeration system, and a heater configured to heat the mold. One or more of the cutting device, a steam generation system or unit, vacuum pump, refrigeration system, and heater may be permanently or removably affixed to the vehicle.

Nonwoven materials of various sizes and types may be provided on the vehicle such that cushioning articles may be laminated, bonded, and/or molded. Additional equipment may be provided on the vehicle to apply added functionality to the articles (e.g. cooling, anti-allergen, probiotic (odor control), deodorizer (UV activated), antimicrobial, scent, etc.).

The mobile molding and bonding vehicle may integrate numerous portions of an exemplary nonwoven production process as described herein. In some embodiments, the vehicle allows for one or more of steps laminating, sizing, and molding as described herein.

A manufacturing/molding process compatible with the mobile system described herein allows for the efficient and low cost manufacturing of three-dimensional objects, such as those which might be used in bedding, furniture, automotive, and other industries, using compressed blanks or boards or cut parts formed from nonwovens. The compressed blanks or boards or cut parts are expandable substrates. They may be stacked, placed vertically, placed in a predetermined pattern (e.g., parts on top of one another or offset, etc.) or be randomly distributed in a mold. They may also be laminated to non-expandable substrates with the composite part then being distributed in the mold. The expandable substrates may be of the same size and shape or be of different sizes and shapes. In addition, expandable substrates of different constitutions (e.g., differing in types of fibers, differing density, differing numbers of layers of vertically lapped fibers, differing in terms of the presence or absence of non-expansible layers, etc.) may be used in the same mold according to recipes designed to achieve the goals of the manufacturer. Upon application of heat to a temperature above the melting temperature of the binder material in the expandable substrates, the expandable substrates expand to fill all or part of the mold. After application of heat, the three-dimensional object is cooled within the mold, thereby allowing the binder material to harden. The process thus produces at least one object with a shape that at least partially assumes a configuration defined by the mold.

In some embodiments, a steel, polymer or wood frame may be placed in the mold with the expandable substrates. Upon formation of the three-dimensional object, the three-dimensional object will be adhered or otherwise joined to the steel, polymer or wood frame. This methodology may, for example, be used to produce car seats (backs or bases), or seats for trains, planes, and boats. Similarly, this methodology may, for example, be used to produce bedding (e.g., mattresses, mattress toppers, pillows, etc.) with the molded, cushion like nonwoven part being positioned for a person to lay on, and with the frame embedded therein.

The methodology allows for tailoring the attributes of the three-dimensional object to be produced in any desired fashion. For example, depending on the "recipe", as determined by the constituents of the expandable substrates used in the mold, different bedding or seating firmness or softness can be produced. For example, laminated boards with a more expandable layer of nonwoven material can be placed at the top of a mold in order to produce a surface layer of a seat or bed which a person comes in contact with that is softer and "cooler" due to the ability of air to flow through an expanded non-woven material.

The methodology may be used to make three dimensional objects of almost any size and shape. The only limitation appears to be in the shape of the mold itself.

In an exemplary embodiment, a three-dimensional object is formed by the following process, any or all of the steps which may be performed on a vehicle as described herein. A nonwoven material is formed into blanks by compressing the nonwoven under pressure after melting the binder material. Application of heat during the compressing process can be done using hot air, ovens, induction coils, infrared or other means for applying heat energy. While in its compressed state, the nonwoven is cooled in order for the binder material to re-harden (solidify). This may be accomplished simply by removing the heat and/or by blowing cool air through the blanks. The blanks thus formed will typically have a height dimension substantially less than the nonwoven starting material (e.g., 10% to 50% as thick as the pre-compressed assembly; however, differing thicknesses may be used, with the chief requirement being that the compressed dimension is at least smaller than the original dimension of the nonwoven (be it height, width, or length), and preferably 50% smaller, 60% smaller, 70% smaller, 80% smaller, 90% smaller, etc.

If desired, the blanks can be laminated together to form boards. Or the blanks can be laminated together with non-expandable materials such as foams, fabric (e.g., knitted material), rubber, metal, metal alloy, polymeric, ceramic, and paper materials. If desired, these boards may be cut to form parts which have specific sizes and shapes with a die, CNC machine, milling machine, scissors, or other suitable device, any or all of which may be provided on a vehicle as described herein.

The blanks, boards, or parts are all "expandable substrates". In some applications, the expandable substrates can be deposited in a mold which is to mold the shape of the desired three-dimensional object. The advantage of precisely cut parts is that the fabricator can stack the parts in the mold in an orderly fashion so that upon heating the mold may be filled (or at least partially filled in a desired area) by an expanded substrate. However, in other applications, a certain number of boards might simply be randomly dropped into the mold. Depending on the specifications of the fabricator, the expandable substrates may be placed in the mold in particular orders so as to achieve various attributes for the three-dimensional objects once it is made (e.g., softer top and sides and firmer middle, etc.). These particular orders, as well as the selection of the nonwoven material that is compressed, as well as any non-expandable material to be incorporated in the mold can be considered a "recipe" which will result in the production of three dimensional objects with tailored attributes. For example, different recipes would be used for producing firm or soft mattresses or firm or soft seating.

As discussed above, a frame or other device, or simply other materials, e.g., a metal support screen, etc. may also be incorporated into the mold, such that the three dimensional object, once fabricated, adheres to or is otherwise connected to the frame, device, or material. After the mold is partially filled with the expandable substrates, the mold is heated. Application of heat softens (i.e., melts) the binder material which, in turn, allows the stored potential energy of the nonwoven fiber to be released as kinetic energy. That is, the nonwoven fiber expands in at least one dimension (e.g. the dimension it was compressed) back towards its original configuration in the nonwoven material prior to compression of the nonwoven. Depending on the fullness of the mold, the expandable substrate will expand to fill the inside of the mold, and, will adopt the contours of the mold (e.g., flat surfaces, curved surfaces, etc.). After expansion, the mold can be cooled (e.g., by application of cool air, vacuum or otherwise), and the three-dimensional object may be retrieved from the mold.

In some embodiments, steam heating is improved by pressurizing the mold with compressed air before introducing steam heat. The steam is then permitted to flow into the mold at a reduced velocity by exhausting some of the compressed air from the mold. As the compressed air is exhausted out of the mold, the pressurized steam is permitted to flow into the mold. The pre-pressuring process allows for more uniform application of steam to the expandable substrates within the mold, and reduces or eliminates damage to the expandable substrates that might otherwise be caused by fast-moving steam and the resultant forces of the same. In addition, steam heating is improved by using a vacuum pump system to facilitate moisture removal, steam removal, and associated heat removal from the mold after the application of steam heat to the expandable substrates. A further outcome with use of vacuum pump system includes improved, more-uniform expansion of the expandable nonwoven. It is preferred that the mold be heated to approximately the same temperature as the high-pressure saturated steam that is directed into mold. However, the exhausted steam leaves much residual heat in the three-dimensional object being fabricated, which can make it difficult to remove the object from the mold without damage. By using vacuum drying, water within the mold which may originate from the steam or from some of the materials in the expandable substrate itself may be boiled off at lower temperatures. This rapid evaporation of residual moisture from the expandable nonwoven substrate, due to the application of a vacuum pressure inside the mold at the end of application of steam heat, allows for absorbing the latent heat of the product, thereby allowing the three-dimensional product to be more easily removed from the mold. In addition, application of vacuum pressure also permits a more uniform rise of the expandable nonwoven substrate.

Figure 2:
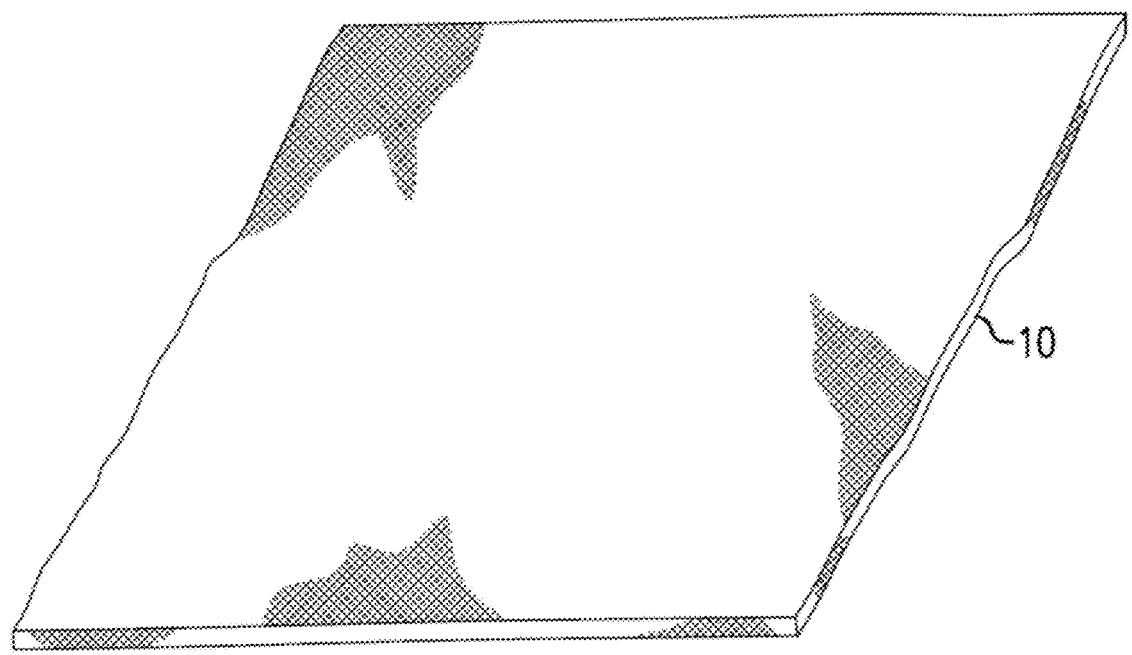
FIG. 2 is an exemplary isometric view of a fibrous nonwoven material.

FIG. 2 shows an example of a nonwoven 10 material. In particular, this disclosure pertains to the use of what are often termed thermobonded nonwoven materials, where a fibrous mass (i.e., one that is not "knitted" or "woven") has adjacent fibers joined together at varying locations by binder material. The nonwoven 10 has height, width, and length dimensions (i.e., it is three-dimensional in character). A "nonwoven" is a manufactured sheet, web, or batt of natural and/or man-made fibers or filaments that are bonded to each other by any of several means. Manufacturing of nonwoven products is well described in "Nonwoven Textile Fabrics" in Kirk-Othmer Encyclopedia of Chemical Technology, 3rd Ed., Vol. 16, July 1984, John Wiley & Sons, p. 72-124 and in "Nonwoven Textiles", November 1988, Carolina Academic Press. Nonwovens are commercially available from a number of manufacturers.

Figure 3:
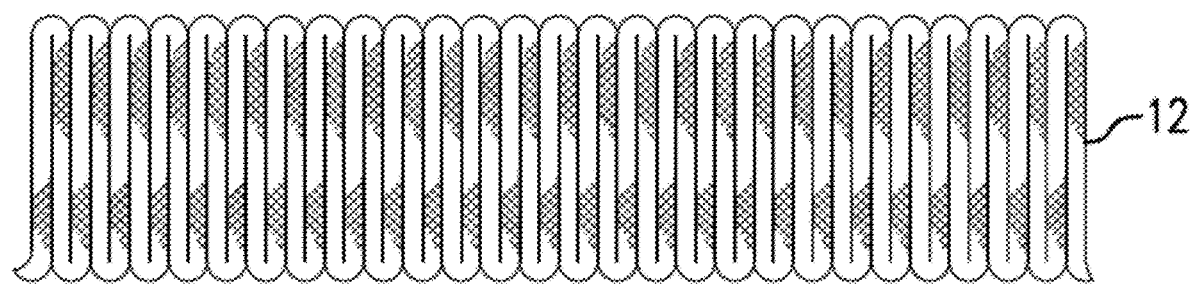
FIG. 3 is an exemplary side view of a vertically lapped fibrous nonwoven material

FIG. 3 shows an example of a vertically lapped nonwoven 12 material. Vertical lapping may be performed using methods known in the art, e.g., as set forth in US 2008/0155787 and U.S. Pat. No. 7,591,049, each of which is incorporated herein by reference. Vertically lapped nonwovens are commercially available from a number of sources. Because of the configuration of the lapping, such as is shown in FIG. 3, the nonwoven 12 has more support and resilience in the vertical direction.

Fibers which may be used in nonwovens according to the disclosure are wide ranging and include any fibrous network which, when heated in an unmolded environment, will expand at least 5% in any direction (i.e., expansion in at least one of the vertical, horizontal, or lateral directions, and possibly all of these directions). The nonwoven can be obtained from a number of commercial sources, and may be in a vertically lapped configuration, cross lapped configuration or random configuration. Vertically lapped (V-Lap) configurations may provide some advantages in terms of support or comfort when boards/blanks made of V-Lap are expanded in a mold and they are oriented in a direction which opposes, for example, the weight of a person's back or buttocks. In the practice of this invention, V-lap nonwoven is preferably used, and is preferably compressed to form boards, as will be described below. The V-lap nonwoven will be generally compressed 50%, 60%, 70%, 80%, 90%, etc. from its original height dimension, and, on subsequent heating will be able to expand towards, up to, or beyond its original height dimension.

Nonwovens in the practice of this invention are typically fabricated from a mass of fibers which include binder fibers and one or more other fibers. The binder fibers have a melting temperature that is below the melting or decomposition temperature of the one or more other fibers, e.g., binder fibers typically have a melting temperature of 80-150° C. (polyesters are typical examples of binder fibers used in the production of nonwovens (examples of elastic polyester binder fibers include ELK®, E-PLEX®, and EMF type high elastic LMF are commercially available from Teijin Limited, Toray Chemical Korea Inc., and Huvis Corporation, respectively)). Once the binder fibers are melted, they will generally tack along the outsides of the one or more other fibers, and, on cooling, will harden to produce the nonwoven which is essentially a mass of the one or more other fibers with adjacent fibers held together at various locations throughout the nonwoven by binder material which results from melting and re-hardening of the binder fibers. These nonwovens are often referred to as thermobonded nonwovens. The thermobonded nonwovens in the practice of this invention will have at least 5% by weight binder material, with up to 95% by weight of the one or more other fibers. Depending on the needs of the article manufacturer the binder material may constitute 5-50% by weight of the nonwoven with the remainder being the one or more other fibers, or the one more other fibers plus additional materials. For example, the other materials can include but are not limited to fire retardant compounds scented compounds, antimicrobial compounds or materials (e.g., silver particles or fibers), polymeric coatings, metal or ceramic particles; etc. Examples of FR chemicals/compounds include, but are not limited to, phosphoric acid and its derivatives, phosphonic acid and its derivatives, sulfuric acid and its derivatives, sulfamic acid and its derivatives, boric acid, ammonium phosphates, ammonium polyphosphates, ammonium sulfate, ammonium sulfamate, ammonium chloride, ammonium bromide.), The ratio of binder material to the one or more other fibers in the nonwovens used in the practice of the invention can vary widely from 5% by weight binder material:up to 95% by weight one or more other fibers; 10% by weight binder material:up to 90% by weight one or more other fibers; 15% by weight binder material:up to 85% by weight one or more other fibers; 20% by weight binder material:up to 80% by weight one or more other fibers; 25% by weight binder material:up to 75% by weight one or more other fibers; 30% by weight binder material:up to 70% by weight one or more other fibers; 35% by weight binder material:up to 65% by weight one or more other fibers; 40% by weight binder material:up to 60% by weight one or more other fibers; 45% by weight binder material:up to 55% by weight one or more other fibers; 50% by weight binder material:up to 50% by weight one or more other fibers; 55% by weight binder material:up to 45% by weight one or more other fibers; 60% by weight binder material:up to 40% by weight one or more other fibers; 65% by weight binder material:up to 35% by weight one or more other fibers; 70% by weight binder material:up to 30% by weight one or more other fibers; 75% by weight binder material:up to 25% by weight one or more other fibers; etc. Depending on the application, the ratio may range from 5:95 to 95:5.

Examples of thermobonded nonwovens which may be used in the practice of this invention include but are not limited to:

any thermobonded nonwoven made with up to 95% of any denier, any fiber length, polyester fiber. Exemplary types of polyesters which may be used in the practice of the invention include, but are not limited to PET (polyethylene terephthalate), PTT (polytrimethylene terephthalate), and PBT (polybutylene terephthalate);

any thermobonded nonwoven made with up to 95% of any denier, any fiber length, polyacrylonitrile fiber;

any thermobonded nonwoven made with up to 95% of any denier, any fiber length, polyvinyl alcohol fiber (PVA);

any thermobonded nonwoven made with up to 95% of any denier, any fiber length, polytetrafluoroethylene fiber (PTFE), like TEFLON for example;

any thermobonded nonwoven made with up to 95% of any denier, any fiber length, polyamide fiber, like nylon or perlon for example;

any thermobonded nonwoven made with up to 95% of any denier, any fiber length, wool fiber;

any thermobonded nonwoven made with up to 95% of any denier, any fiber length, coconut fiber;

any thermobonded nonwoven made with up to 95% of any denier, any fiber length, hemp fiber;

any thermobonded nonwoven made with up to 95% of any denier, any fiber length, flax fiber;

any thermobonded nonwoven made with up to 95% of any denier, any fiber length, jute fiber;

any thermobonded nonwoven made with up to 95% of any denier, any fiber length, cotton fiber;

any thermobonded nonwoven made with up to 95% of any denier, any fiber length, viscose fiber, like rayon for example;

any thermobonded nonwoven made with up to 95% of any denier, any fiber length, polyethylene fiber;

any thermobonded nonwoven made with up to 95% of any denier, any fiber length, polypropylene fiber;

any thermobonded nonwoven made with up to 95% of any denier, any fiber length, Kevlar fiber;

any thermobonded nonwoven made with up to 95% of any denier, any fiber length, Basofil fiber;

any thermobonded nonwoven made with up to 95% of any denier, any fiber length, Belcotex fiber;

any thermobonded nonwoven made with up to 95% of any denier, any fiber length, Nomex fiber;

any thermobonded nonwoven made with up to 95% of any denier, any fiber length, O-PAN fiber;

any thermobonded nonwoven made with up to 95% of any denier, any fiber length, Tencel fiber; and any thermobonded nonwoven made with up to 95% of a mixture of any of the fibers set forth above or any mixture of fibers with other fibers of interest (e.g. silver fibers for providing antimicrobial resistance, basalt fibers, natural fibers (e.g., cotton, ramie, coir, hemp, abaca, sisal, kapok, jute, flax, linen, kenaf, coconut fiber, pineapple fiber, wool, cashmere, and silk), man-made fibers (e.g., polyester, nylon, acrylics, acetate, polyolefins, melamine fibers, elastomeric fibers, polybenzimidazole, aramid fibers, polyimide fibers, modacrylics, polyphenylene sulfide fibers, oxidized PAN fiber, carbon fibers, novoloid fibers, manufactured cellulosic fibers (e.g., rayon, lyocell, bamboo fiber, Tencel, and Modal), and manufactured fire-retardant (FR) cellulosic fibers (e.g., Visil®, Anti-Fcell, Daiwabo's Corona. fibers, Anti-Frayon, Sniace's FR rayon, and Lenzing FR)).

It is also noted that hollow core fibers, e.g., hollow core polyethylene terephthalate (PET) may be used in nonwovens for use in the practice of the invention. In addition, nonwovens useful in the practice of the invention can be formed using composite fibers, sometimes referred to as sheath-core fibers. Binder fibers used to produce nonwovens useful in the practice of this invention include sheath-core fibers, where the sheath is polyester or some other low melting temperature material.

Examples of nonwovens that would not be usable in the practice of the invention include:

any thermobonded nonwoven made with a fiber that melts at an equal or lower temperature than the binder fiber's melt temperature; and any thermobonded nonwoven made with only binder.

Figure 4A:
FIGS. 4a and 4b are schematic side-view illustrations showing that the fibrous nonwoven material is densified and compressed after application of heat and pressure, followed by cooling to achieve hardening of the binder material while the fibrous nonwoven material is in its compressed state.
Figure 4B:

FIG. 4a schematically shows that the nonwoven 14 has a height dimension prior to compression. FIG. 4b schematically shows that after compression, the height dimension is substantially smaller, and the product from compression 16 is referred to herein as a "blank". In an embodiment of the invention, blanks are made by heating the nonwoven 14 above the melting temperature of the binding material which holds the fibers together and applying pressure to the nonwoven 14 in at least one dimension. After the nonwoven is compressed, the nonwoven is cooled to allow the binding material to re-harden (i.e., solidify) to hold the fibers together in a compressed state called a blank 16. The blank 16 might have a height dimension that is one half to one tenth (or even smaller) the height dimension of the nonwoven in its uncompressed state (e.g., 50%, 40%, 30%, 20%, 10%, etc. the original height dimension). The fibers in the blank 16 effectively have stored potential energy, as the orientation of the fibers in the blank 16 is not the natural orientation they are in when in the form of the manufactured nonwoven 14. While FIGS. 4A and 4B show compression in the height dimension, it should be understood that compression may be performed in any of, or one or more of, the height, width, and length dimensions. Cooling of the blank 16 to harden the binding material can be performed simply by heat removal, by blowing air through the blank or cooling by other means. All that is required, is to have the temperature decrease below the melting point temperature of the binder material so that it re-hardens. As will be discussed below in more detail, blanks such as blank 16 can be laminated to other blanks and/or to non-expanding materials.

Figure 5A:
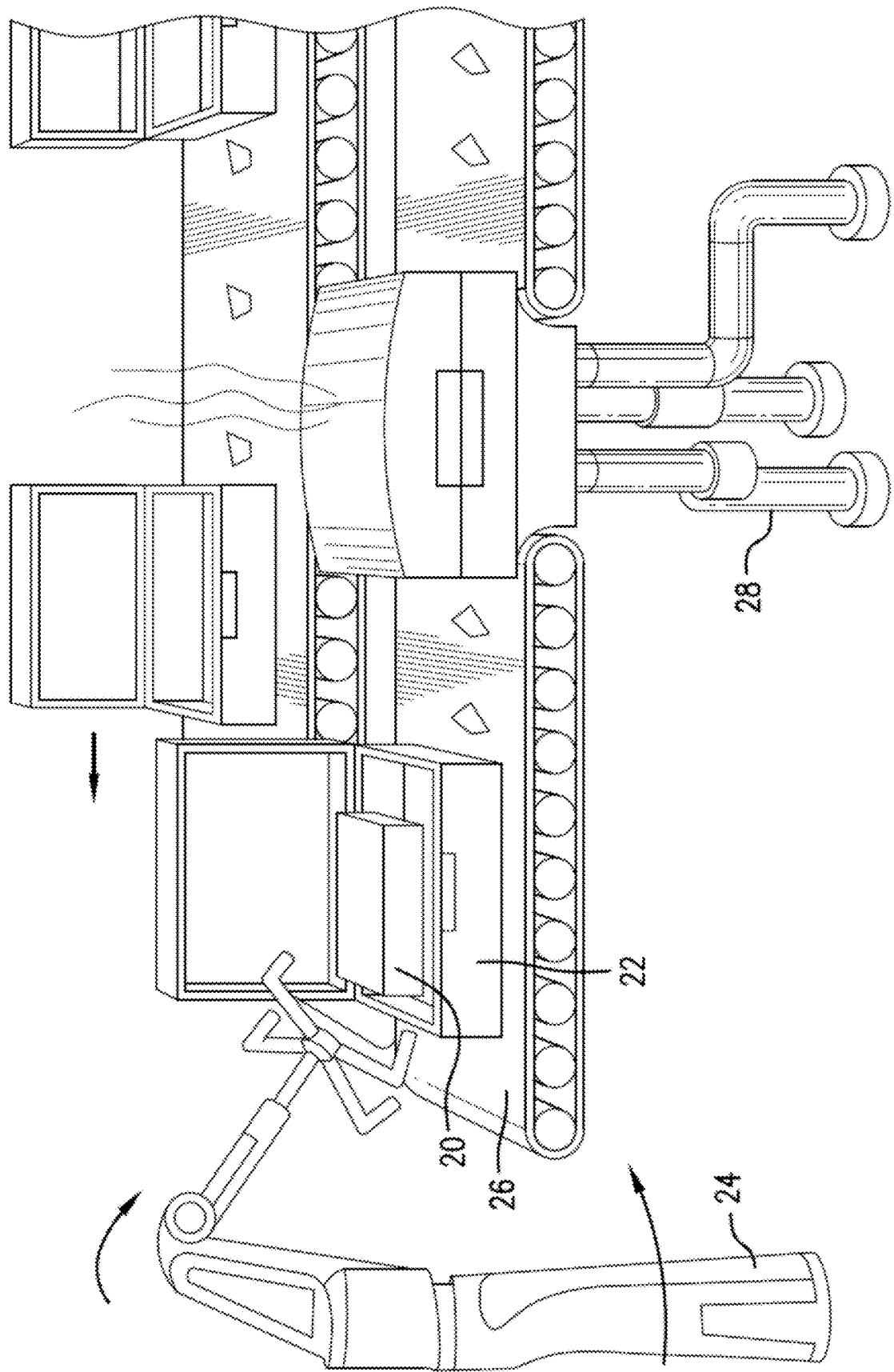
FIGS. 5a and 5b illustrate a simplified process methodology where the expandable material placed is a mold for a mattress is expanded through application of heat to form a mattress (or other desired three-dimensional object) which can be retrieved from the mold.
Figure 5B:
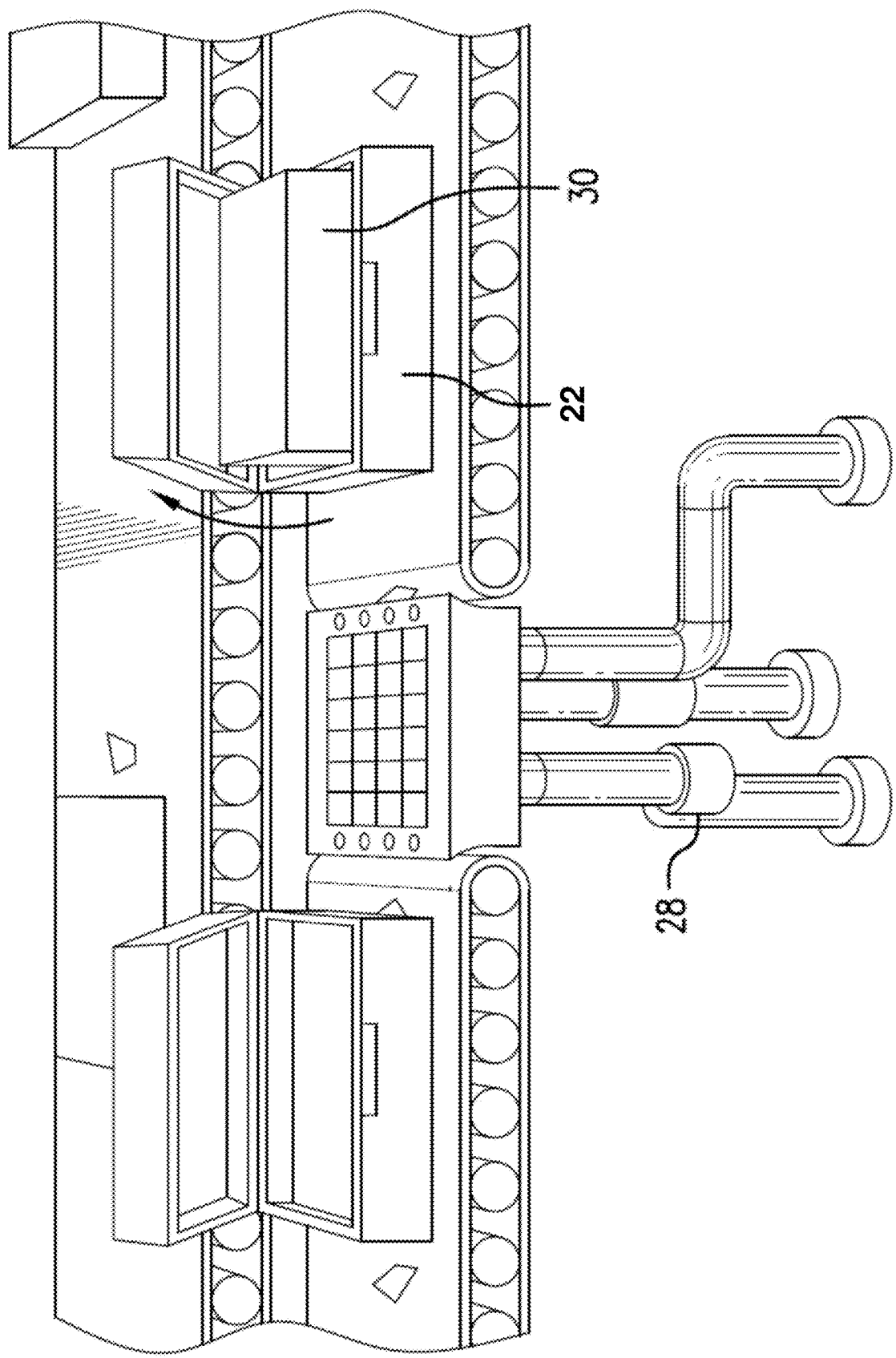

FIGS. 5A and 5B show a simplified production platform to make, for example, mattresses, according to an aspect of the invention (it being understood that most any other three dimensional object (e.g., car seats, etc.) can be manufactured by the same production platform using the same processes. Such a production platform may be arranged on a vehicle as described herein.

In FIG. 5A, an expandable substrate 20 (e.g., one or more of a blank, a board, a cut part, and/or mixtures and multiples of the same) are placed in or dropped into a mold 22. This can be done manually or by robotic arm 24. The mold 22 is shut and then transported, e.g., by conveyor 26, to a heating station 28. For exemplary purposes, the heating station 28 is shown as a plurality of pipes which blow hot air and/or steam onto or into the mold 22; however, the heating station 28 could be an oven or other device which can bring the substrate 20 up to a temperature above the melting temperature of the binding material in the expandable substrate 20. Once the binding material melts, the expandable substrate 20 is permitted to expand back towards its original state. In doing this, the substrate 20 expands to fill all or part of the mold (in FIG. 5b, it can be seen the entire mold was filled). FIG. 5b shows that after the mold 22 passes by the heating station 28, it is cooled and opened, and includes an expanded substrate 30. In a mattress manufacturing or car seat manufacturing process, for example, the substrate 30 can expand to fit the inner contours (flat, curved, etc.) of the mold 22.

The cooling may be performed at the heating station using a blast of cold air or water, vacuum pump system, or simply by waiting for the mold 22 to cool down. During cooling, the binding material solidifies as the temperature dips below the melting point temperature. This holds the expanded material 30 together as a molded three-dimensional article.

Figure 6A:
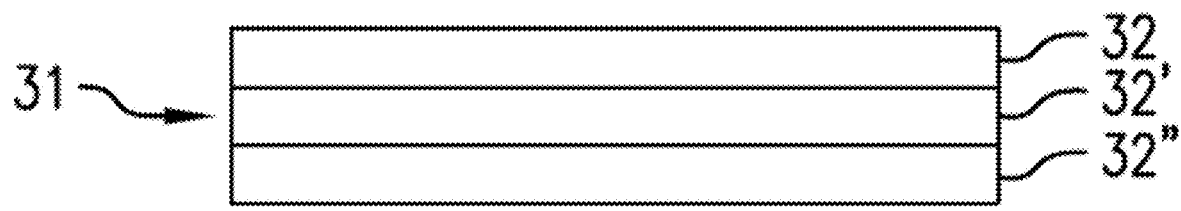
FIGS. 6a and 6b are schematics showing different laminated layups of expandable boards.

FIG. 6A shows an expandable substrate 31 in the form of a three-layer board. The individual layers 32, 32', and 32" can be blanks such as described in FIG. 4b above which are laminated together. The blanks 32, 32', and 32" can have the same size and shape as shown in FIG. 6A, or they may have different sizes and shapes depending on the mold and the fabrication requirements for the article to be manufactured. In addition, the blanks 32, 32' and 32" may have the same fibers and binders as each other and same ratio of fibers and binders as each other. Alternatively, and depending on the desires of the fabricator, the blanks 32, 32' and 32" may have different ratios of fiber constitution to binder material or may have different fibers or groups of fibers in each layer. For example, one could have different blanks 32, 32', and 32" if there was a desire to have the bottom blank 32" expand less or more than the top blank 32. For example, one or more of the blanks 32, 32' and 32" could be formed from V-lap nonwoven, while one or more of the blanks 32, 32', and 32" is a nonwoven which is non V-lap. Alternatively, one or more of the blanks 32, 32' and 32" could be made of a non-expandable material (e.g., fabric, paper, metal, polymer, rubber, ceramic, foam, etc.)

Figure 6B:
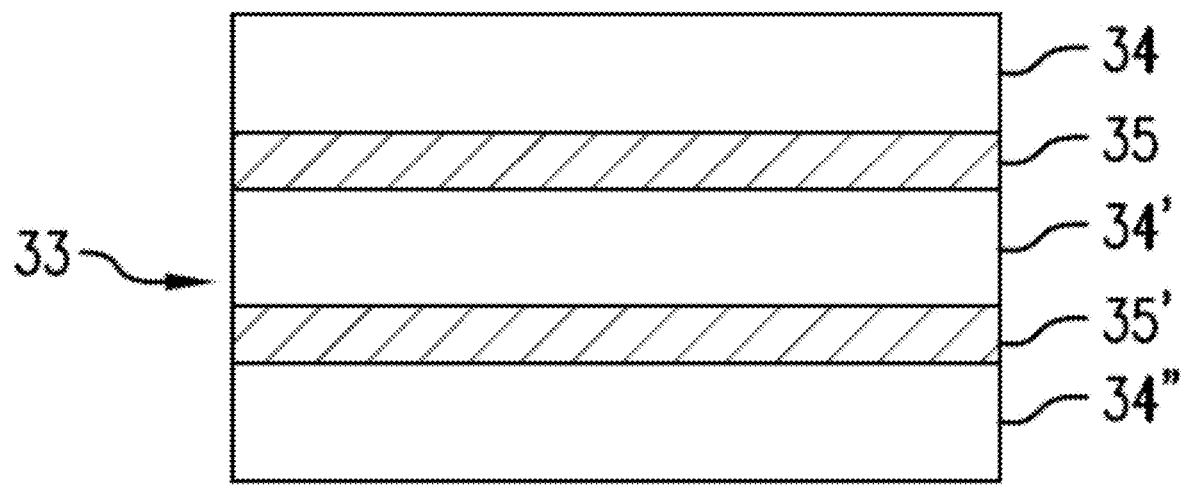

FIG. 6b shows an expandable substrate 33 in the form of a five-layer board. Like FIG. 6A, expandable substrate 33 has three blanks 34, 34' and 34", and the blanks 34, 34', and 34" may be the same or different in terms of size, shape, fiber constitution, and ratio of fibers to binder material (in terms of weight percentage). However, FIG. 6b also includes non-expandable layers 35 and 35' which may be the same or different from each other. The non-expandable layers can be of almost any material including without limitation foam, fabric, rubber, metal, metal alloy, polymer, ceramic, straw and paper materials. These non-expandable layers may be chosen to provide different attributes to the three-dimensional product being fabricated (e.g., stiffness, water resistance, fire resistance, magnetism, resistance to radiation, etc.). Each of the layers may be laminated together to form the expandable substrate 33 in board form. The expandable substrate 33 of FIG. 6b and the expandable substrate 31 of FIG. 6a may be molded in the same way that the expandable substrate 20 is in FIG. 5a.

Figure 7:
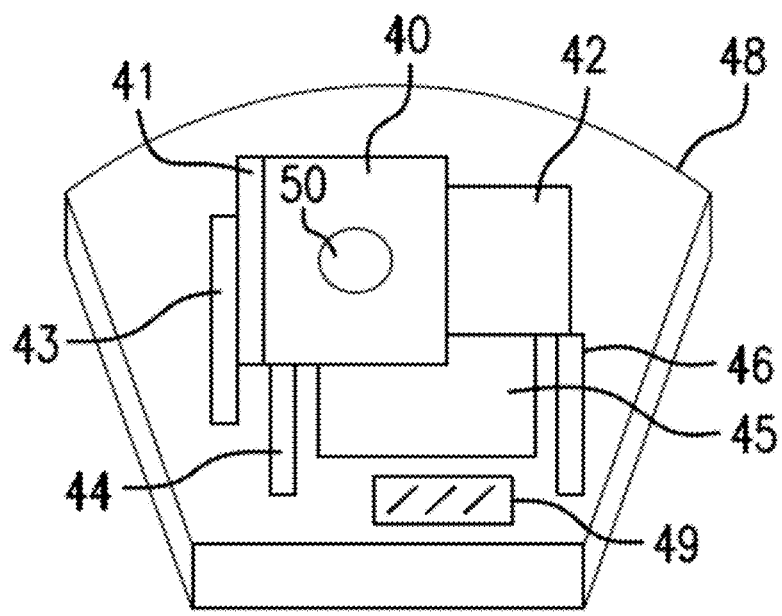
FIG. 7 shows a mold with some boards stacked on one another and others placed vertically within the mold.

FIG. 7 shows that a plurality of boards 40, 41, 42, 43, 44, 45, and 46 (or other expandable substrates) may be placed in a mold 48. They can be positioned on top of one another, or be oriented vertically. In mold 48, boards 40, 42, and 45 may expand vertically within the mold 48, while the vertically oriented boards 41, 43, 44, and 46 may expand laterally within the mold 48. The arrangement of boards within the mold can be neatly placed or randomly oriented (e.g., dropped in). FIG. 7 also shows an expandable substrate in the form of a circular "part" 50. The part 50 can be made using a die, a CNC machine, scissors, or some other cutting device which can cut a board to any desired shape (e.g., circular, polygonal, or amorphous). The part 50 can be adjacent a board 40, and have a different size than board 40. FIG. 7 demonstrates that virtually any expandable substrate 20 (blank, board, or part) according to the present invention can be molded, and that one or more expandable substrates can be used in any molding operation and that they can be put in the mold in specific orders (e.g., to achieve specific properties for the three-dimensional object) or in random order and position. Also, from FIG. 7 it should be clear that non-expandable materials 49 might also be placed in areas of the mold 48 where the expandable substrates (e.g. boards 40-46 and part 50 as shown in FIG. 7) will not expand to fill (e.g., a block of foam or piece of wood (see 49) might be positioned below board 45). These methods advantageously allow one to customize the final products to a desired characteristic such as size, feel, and firmness.

Figure 8:
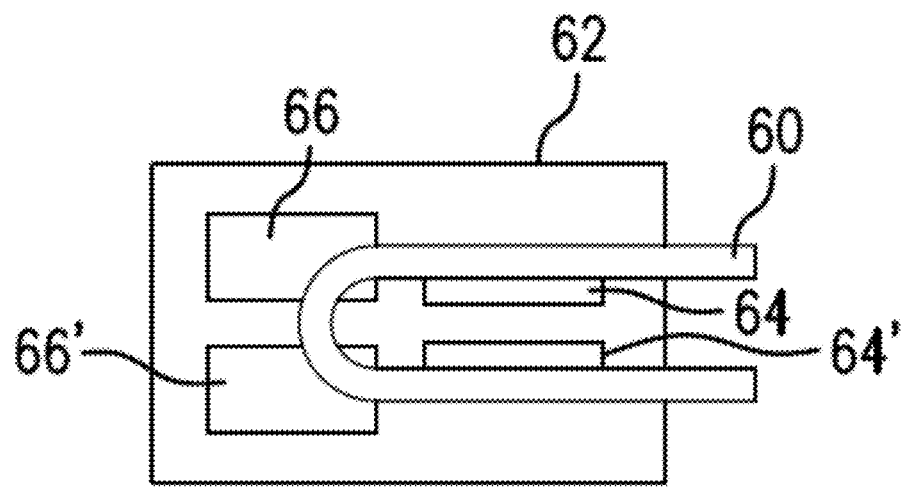
FIG. 8 shows a mold with a frame positioned in the mold with a plurality of boards therein.

FIG. 8 shows a frame 60 extending into a mold 62. Inside the mold are two vertically oriented boards 64 and 64' and two horizontally oriented boards 66 and 66'. As discussed above, boards 64 and 64' and 66 and 66' may be the same or different in terms of size, shape, constitution of fibers, or ratio of fibers to binder material (in terms of weight percentage). While FIG. 8 shows boards in the mold 62, other forms of expandable materials may also be used including parts 50 (see FIG. 7) or blanks (see FIG. 4b). The two horizontally oriented boards 66 and 66' are positioned respectively above and below the frame 60. The frame 60 may be metal, metal alloy, ceramic, wood, or some other non-expandable material. Once the boards in FIG. 8 are expanded, the three-dimensional object which can be retrieved from the mold 62 will have the frame positioned therein. The frame 60 will adhere to or otherwise be attached to the expanded substrate.

In one embodiment, the three-dimensional composite is made according to a method comprising the following steps, one or more of such steps occurring on a vehicle as described herein:

1) producing two or more blanks from nonwoven staple fibers and binder fibers;
2) compressing the two or more blanks to a predetermined thickness in the presence of heat to form a board;
3) cutting the board in a pre-determined two-dimensional shape to make a part; and
4) heating the part within a mold to create a three-dimensional composite.

In one embodiment, one or more specifically selected staple fibers, chosen based on their function (properties) of the final product are blended to form a controlled mass. The controlled mass is made with a specific weight concentration of the staple fibers and binder fibers. The staple fibers and the binder fibers are dosed such that the concentration of the binder fiber is from about 90% (wt. %) to about 5% (wt. %), e.g., from about 10%-80% binder fibers, e.g., 10%, 20%, 30%, 40%, 50%, 60%, 70%, or 80% (wt. %). In one embodiment, the specifically selected binder fibers are elastomeric binder fibers and the staple fibers are polyester staple fibers. In another embodiment, the specifically selected binder fibers are low-melt bicomponent polyester staple fiber and the other selected staple fibers are polyester staple fibers. In yet another embodiment, there are two specifically selected binder staple fibers, i.e. a low-melt bicomponent polyester staple fiber and an elastomeric binder fiber, with another specifically selected staple fibers.

In some embodiments, other fibers in addition to the staple and binder fibers may be included in the blend. For example, additional cellulosic fibers such as rayon or viscose may be included. In some embodiments, fibers that have been treated to exhibit one or more properties such as hydrophobicity, hydrophilicity, and antimicrobial properties are included.

In particularly preferred embodiments, the nonwovens thus made are V-lap nonwovens.

In one embodiment, one or multiple blanks are laid on top of one another, heated, then compressed, e.g. laminated, and cooled, e.g. via ambient air, to a consolidated desired thickness to make the boards. The blanks may be heated to a temperature of about 300-500° F., e.g. 300-350° F., or 390-425° F. In yet another aspect, the boards have a thickness less than the sum of the thickness of the blanks. In a further embodiment, the boards are cut into two-dimensional shapes to make the parts. The boards are cut into two-dimensional shapes using for example a die board and a hydraulic press or an automated 2-axis CNC cutter.

Figure 9A:
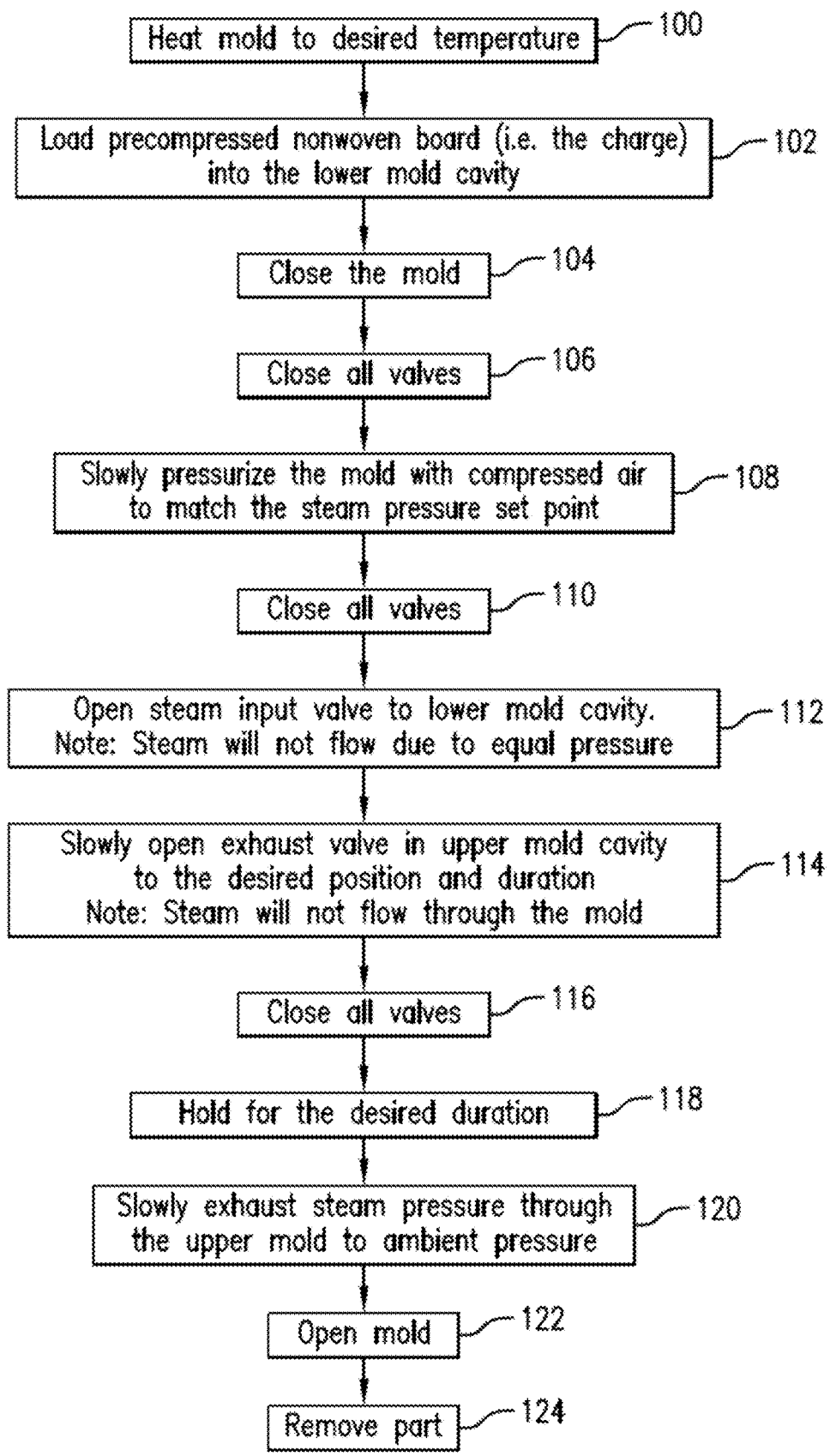
FIGS. 9a-9c are flow diagrams setting forth improvements in steam molding of expandable substrates according to the present disclosure.
Figure 9B:
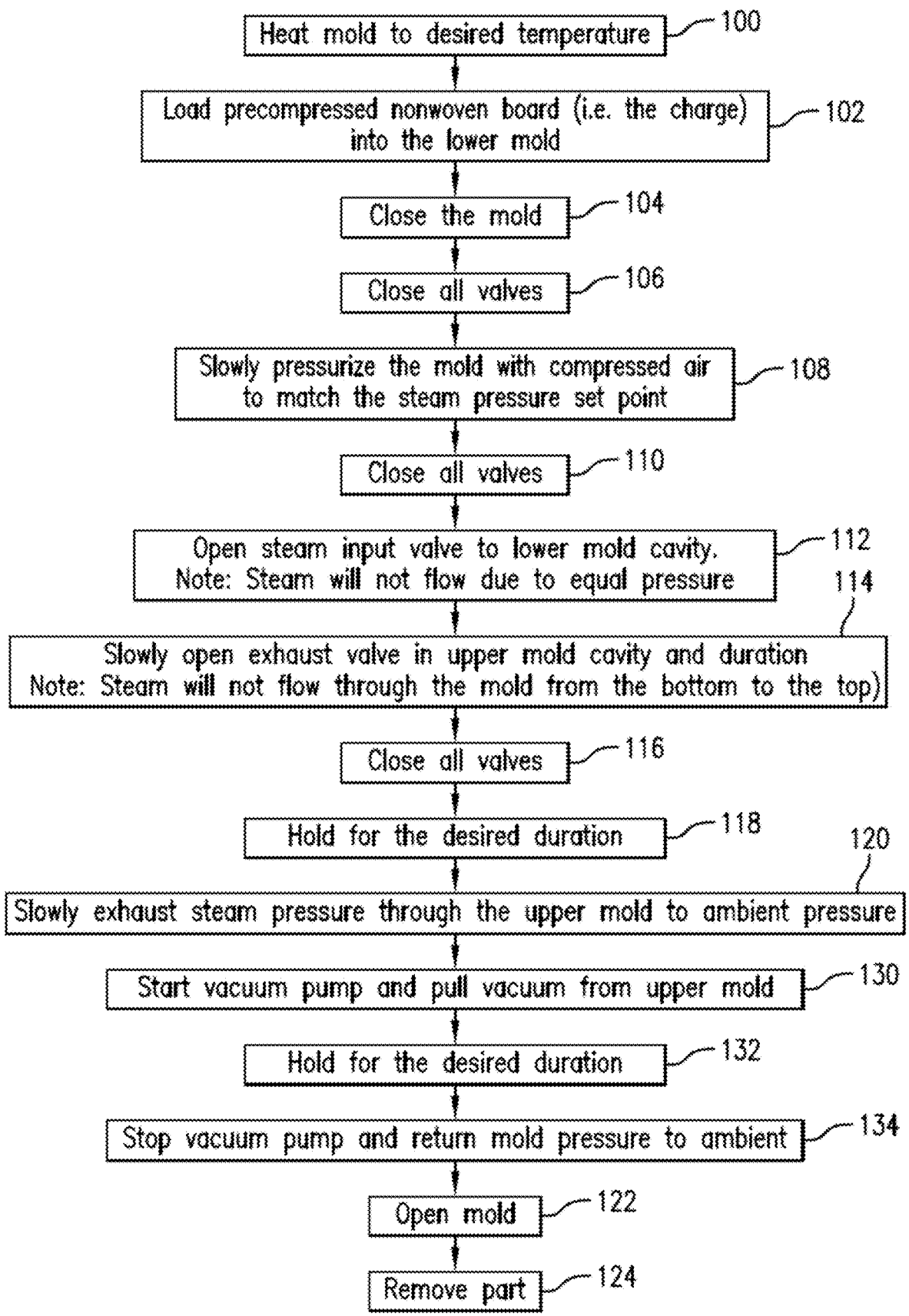

FIGS. 9a and 9b show various improvements when steam heating is used to heat the expandable substrates placed or dropped in a mold. The processes involve introducing steam directly into the mold, as opposed to heating up the outside of the mold as is shown in FIG. 5a. Like numerals in the two figures denote like elements.

With particular reference to FIG. 9a, the mold is preferably heated to the same or approximately the same temperature as the steam that will be introduced into the mold at step 100. Pre-heating the mold will ensure that when the steam is used to heat up and expand the expandable substrates placed in the mold, the heating will be more uniform from outside to inside, and thus the expansion of the expandable materials will be more uniform. Moreover, if the temperature of the mold is less than the temperature of the steam, then the steam will condense as it encounters the mold surface, resulting in a loss of available energy to deliver to the nonwoven expandable substrate, and wetting the nonwoven expandable substrate with liquid water. As indicated at step 102, the expandable substrates are placed in the pre-heated mold. As discussed above, the expandable substrates could be one or more blanks, one or more boards, one or more cut parts, and mixtures of the same. As noted above, the expandable substrates charged into the mold can be the same or different. Use of different boards according to prescribed recipes of the manufacture can be used to make three-dimensional objects having different properties at different locations on the object (e.g., a harder center with a softer side or top surface, etc.). At step 104 the mold is closed, and at step 106 all valves to the mold (e.g., steam inlet, compressed air inlet, exhaust outlet, etc.) are closed.

As indicated in step 108, the inside of the mold is pressurized with compressed air to match the steam pressure of the steam that will be introduced into the mold. This is accomplished by opening a valve on the mold and pumping in compressed air. Other gases may also be used to pressurize the inside of the mold. Once pressurized, as can be determined by a gas pressure meter or by other means, the valve for the compressed air is again closed at step 110.

The valve connecting the steam into the mold cavity, which can be anywhere on the mold cavity including the upper, lower, and side portions of the cavity is slowly opened at step 112. Because of the pre-pressurization of the mold cavity with compressed air, steam will not immediately flow into the mold. That is, the pressure of the steam will be counter-balanced by the pressurized air in the mold. To have the steam enter the mold, the exhaust valve in the mold cavity is slowly opened to a desired position and duration at step 114. This permits steam to enter and flow through the inside of the mold, thus exposing the expandable substrates therein to steam heat, and allowing for their expansion. Because the entry of the steam is conducted in a controlled fashion, the expansion of the expandable substrates is more uniform which is desirable for making quality three-dimensional objects.

After introduction of the steam the valves are closed at step 116, and the mold is held for a period of time at step 118 during which the expandable substrates expand to fill all or part of the mold. After the requisite time, the steam is exhausted from the mold at step 120, the mold is opened at step 122, and the three-dimensional object is retrieved from the mold at step 124.

Not to be bound by theory, the core idea (based upon the conservation of energy, the continuity equation, the Bernoulli principle, and Newton's second law of motion) addresses the fluid dynamics behavior occurring in the mold (during the molding process) and adds control of parameters which are presently not managed with the current methods of manufacturing; slowing the overall rate that energy is added to and exhausted from the system. Rather than allowing high pressure steam to enter the mold at atmospheric pressure, FIG. 9a shows pressurizing the mold first with compressed air to an internal mold pressure that's equal to that of the steam heat. Given that the input pressure of the steam to the mold is equal to that within the mold, steam will not flow until a pressure differential is initiated. With a slight opening of the exhaust valve the pressure within the mold may be slowly lowered and steam will begin to flow with a substantially reduced velocity of the steam heat, enabling a more-uniform application of energy to the nonwoven expandable substrate. Exemplary advantages of this approach to steam molding includes a more uniform rise of the expandable substrate, complete filling of the mold cavity subsequent to expansion of the nonwoven substrate and elimination of damage to the expandable substrate caused by the fast-moving steam and the forces resultant to the same.

FIG. 9b is identical to FIG. 9a except for the addition of steps 130, 132, and 134. FIG. 9b addresses the problem of the steam leaving significant residual heat in the expandable substrate in the mold. It is addressed with the use of a vacuum pump system to facilitate removal of moisture, steam and the associated heat. It is known that the addition of steam into an environment with lower temperatures will cause the steam to condense to liquid water. Given this, steam molding parameters typically call for mold temperatures that are equal to the temperature of high-pressure, saturated steam. While addressing the condensation issue, the exhausted steam leaves much residual heat in the part, making it difficult to remove the article without damage.

As can be seen from FIG. 9b, after, or concomitantly with exhausting the steam pressure from the mold, a vacuum pump is used to pull a vacuum in the mold at step 130. After a vacuum is pulled, the mold is held with a vacuum pressure for a period of time at step 132. Then, at step 134, the vacuum pump is stopped and the mold is returned to ambient pressure before it is opened at step 122 and the part is removed at step 124. Vacuum drying is based on the phenomenon that as the vapor pressure on a liquid reduces, its boiling point reduces. The boiling point of a liquid is defined as the temperature at which the vapor pressure of the liquid is equal to the external pressure. When the pressure above a liquid is reduced, the vapor pressure needed to induce boiling is also reduced, and the boiling point of the liquid decreases. By reducing pressure, the process is permitted to boil off water at lower temperatures. This rapid evaporation of residual moisture from the expandable nonwoven substrate (due to the low surrounding pressure), absorbs the necessary latent heat for the phase change from the product itself. The latent heat required for evaporation is obtained mostly from the sensible heat of the product and because of the evaporation of residual moisture, the temperature of the product is reduced, and the product can be cooled down to a desired temperature that enables safe removal from the mold. A more uniform rise of the expandable nonwoven substrate is anticipated in a manner consistent with more uniform rising of a loaf of bread (noted by those in that industry who utilize vacuum cooling for baked goods); this being a desirable outcome in addition to solving the demolding problem.

Figure 9C:
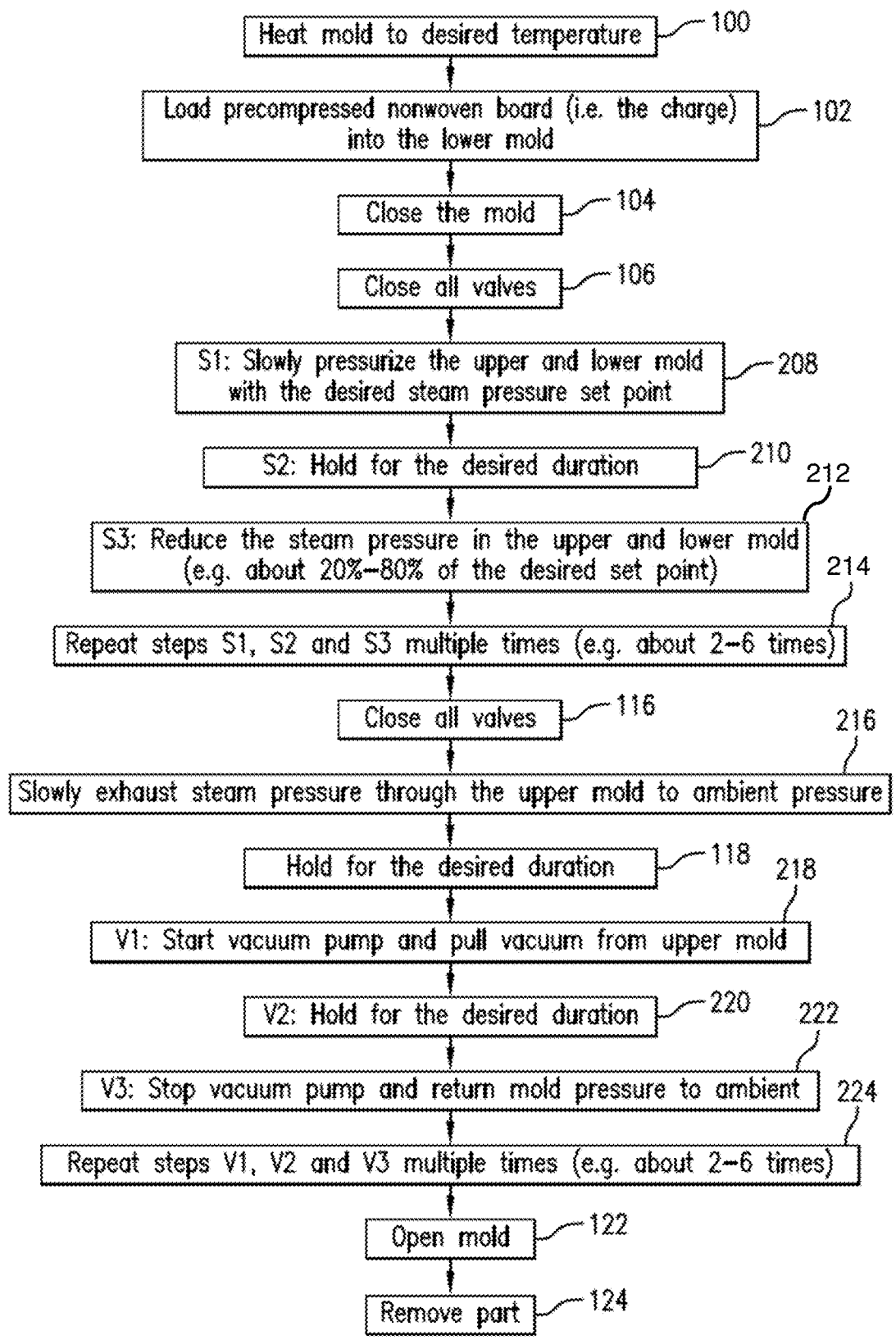

FIG. 9c is similar to FIG. 9b, but includes additional steps for pressurizing the mold multiple times (208, 210, 212, and 214), exhausting steam pressure (216), and applying vacuum pressure to the mold multiple times (218, 220, 222, and 224). It has been found that the nonwoven expandable substrates will expand more uniformly and fully within the mold by one or more of controlling pressurization of the mold when applying steam inside of the mold, and controlling the application of a vacuum pressure inside the mold prior to removal of the part from the mold.

In FIG. 9b, it was noted that pre-pressurizing the mold with a gas (e.g., compressed air) to match the steam pressure set point at step 108 can provide a number advantages when expanding the expandable substrates. FIG. 9c shows a specific process which will achieve these objectives in an alternate, orderly fashion. Specifically, at step 208, the mold is slowly pressurized with the steam to a specified steam pressure set point. This can take place in the entire mold cavity, if the expandable substrates are to fill the entire cavity, or just in the lower or upper mold, for some applications, such as when the substrates will only be expanded in the upper or lower mold. At step 210, the pressurized mold is held for a period of time under the desired pressure. Then, at step 212 the pressure is reduced by preferably 20% to 80% of the desired set point by, for example, exhausting a portion of the steam from the mold. This process is repeated 2-6 times at step 214. This process allows the manufacturer greater opportunity to add steam energy to the mold which assures better and more uniform expansion of the expandable substrates when the steam pressure is applied.

At step 216 in FIG. 9c, the steam pressure is exhausted out of the mold, such as through a port in the upper mold. This is permitted until the mold achieves ambient pressure therein. Then, at step 118, the mold is held, at ambient pressure for a period of time before performing vacuum operations.

In FIG. 9c, a vacuum pump operation is performed at steps 218, 220, 222, and 224 prior to the mold being opened. As discussed in connection with FIG. 9b. the vacuum can pull excess heat remaining in the mold from the steam, as well as water or other liquids which may be present in the mold. At step 218 a vacuum is pulled on the inside cavity of the mold. This can be achieved through a port in the upper mold or by other means. At step 220, the vacuum pressure is maintained for a period of time once a selected vacuum pressure inside the mold is achieved. This subjects the now expanded expandable substrates to a vacuum pressure which may be useful in helping more uniformly expand the nonwoven material. At step 222, the pumping is stopped and the mold is permitted to return to ambient pressure. At step 224, the entire process is repeated, for example, 2-6 times with the vacuum being applied, the mold being held under vacuum pressure for a period of time, and the vacuum pressure being exhausted from the mold. The application of the vacuum pressure helps remove contaminants such as water, other fluids, gases, debris, etc., which may be present in the mold. In addition, the vacuum pressure helps remove excess heat from the mold. Finally, the repetitive application of vacuum pressure leads to a more uniform product being produced in the mold.

FIGS. 9a, 9b and 9c all represent different potential processes that can be implemented alone or in combination with other processes when molding the self rising expandable substrates on a vehicle as described herein. FIG. 9a illustrates slowing the rate that steam is allowed to enter the mold by first pressurizing the same with air. FIG. 9b illustrates adding a vacuum pump to the end of the cycle to facilitate evaporative cooling and more uniform rise of the board. FIG. 9c shows using a series of 'steam blasts with partial steam exhaust cycles' to increase the amount of energy that's added to the system and a series of vacuum cycles to increase the rate of removal of heat and moisture.

To perform efficient vacuum cooling, there are several considerations to be followed to ensure that that the vacuum chamber, vacuum pump, and refrigeration system, all of which may be arranged on a vehicle as described herein, work together to achieve optimum and efficient cooling results.

Vacuum Chamber: The vacuum chamber is used to hold the product to be cooled. In the described methodology, the vacuum chamber is the mold that contains the expandable nonwoven substrate.

Vacuum Pump: The vacuum pump evacuates the air contained in the vacuum chamber (i.e. the mold). The evacuation of hot, moist air causes a pressure drop inside the mold, resulting in a temperature drop within the product (i.e. expanded nonwoven article) and inside the chamber due to evaporative cooling. Evaporative cooling is achieved as the moisture in the product boils off under the reduced pressure caused by the vacuum pump within the vacuum chamber. The air to be evacuated from the vacuum chamber includes the air surrounding the product and the air that is in empty spaces found within the open structure of the expanded nonwoven article. The vacuum system should be sized adequately to lower the atmospheric pressure in the vacuum cooler at an acceptable rate. A vacuum system that is oversized can add extra, unnecessary equipment and operational costs, while an undersized system may not achieve cycle time requirements.

Refrigeration System: The refrigeration system for the vacuum cooler is used to re-condense the heat laden vapor that is boiled off from the product being cooled. This allows the vacuum system to continue to lower the atmospheric pressure inside the chamber, resulting in further cooling of the product. The re-condensing of the vapor also prevents the moisture from getting into the vacuum pumps. Excess moisture in vacuum pumps has the potential to re-condense in the lubricating oil in the pumps. This leads to reduced performance and speed when it comes to evacuating the chamber and will also shorten the operating life of the vacuum pumps. As evident from the explanation above, it is required that each of the functional components of a vacuum cooling system be engineered and sized appropriately to prevent them from working against each other. A balanced system is required for a vacuum cooler to perform its job efficiently, with acceptable cycle times, and in a cost-effective way.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

EXAMPLES

Example 1

To make an automotive seat cushion with a firm feel, three layers of 30% by weight of TEIJIN 6 dtex×64 mm elastomeric binder staple fiber and 70% by weight of HUVIS 3d×51 mm hollow dry conjugated crimp polyester staple fiber, with 550 gram per square meter of the density and 30 mm of thickness were stacked one top of each other. The three layers were heated, compressed and cooled into one board with a thickness of approximately 30 mm. The board was cut to fit inside the outer dimensions of the seat cushion mold to make a part. The part was then placed inside the cushion mold cavity and the mold was closed and heated to 400° F. for 150 min, cooled at ambient temperature for 90 min for afford the formed automotive seat cushion.

Example 2

To make an automotive seat cushion with a plush feel, two layers of 30% by weight of TEIJIN 6 dtex×64 mm elastomeric binder staple fiber and 70% by weight of HUVIS 3d×51 mm hollow dry conjugated crimp polyester staple fiber, with 550 gram per square meter of the density and 30 mm of thickness were stacked one top of each other. The two layers were heated, compressed and cooled into one board with a thickness of approximately 20 mm. The board was cut to fit inside the outer dimensions of the seat cushion mold to make a part. The part was then placed inside the cushion mold cavity and the mold was closed and heated to 400° F. for 150 min, cooled at ambient temperature for 90 min for afford the formed automotive seat cushion.

Example 3

To make an automotive seat backrest with stiff B-side, two (2) layers of 550 grams per square meter density, 30 mm thickness, 30% by weight of TEIJIN 6 dtex×64 mm elastomeric binder staple fiber and 70% by weight of HUVIS 3d×51 mm hollow dry conjugated crimp polyester staple fiber were laid on top of one (1) layer of 400 grams per square meter density, 20 mm thickness, 30% by weight of HUVIS 4d×51 mm low-melt bicomponent coPET/PET sheath/core sheath melting point at 110° C. polyester staple fiber and 70% 6d×51 mm regenerated mechanical crimp polyester staple fiber. The three layers were heated, compressed and cooled to form a board of a thickness of approximately 30 mm. The board was cut to fit inside the outer dimensions of the seat backrest mold to make the part. The part was placed inside the seat backrest mold cavity and the mold was heated to 400° F. for 150 min, then cooled at ambient temperature for 90 min to afford the formed automotive backrest with stiff B-side.

We claim:

1. A mobile molding system, comprising:
 a vehicle;
 one or more expandable nonwoven textile substrates provided on the vehicle, wherein the one or more substrates are formed by
  compressing a nonwoven textile with a binder material;
  applying heat to melt the binder material; and
  allowing the binder material to cool and solidify to form a pre-compressed expandable nonwoven textile substrate; and
 one or more molds arranged on the vehicle configured for receiving one or more expandable nonwoven textile substrates, heating said one or more expandable nonwoven textile substrates so as to cause said one or more expandable nonwoven textile substrates to expand and fill the one or more molds with one or more expanded nonwoven textile containing articles of three dimensional shape, and releasing said one or more expanded nonwoven textile containing articles of three dimensional shape from the one or more molds.

2. The system of claim 1, further comprising one or more of the following provided on the vehicle: a cutting device, a steam generation unit, a vacuum pump, a refrigeration system, and a heater configured to heat the mold.

3. The system of claim 2, wherein the nonwoven textile substrates are vertically lapped, carded nonwoven boards.

4. The system of claim 1, wherein the one or more molds are permanently affixed to the vehicle.

5. The system of claim 1, wherein the vehicle is a truck, flatbed, or trailer.

* * * * *